T. O'DONNELL.
BILL AND HOLDER FOR THE SAME.
APPLICATION FILED DEC. 29, 1913.
1,149,778. Patented Aug. 10, 1915.
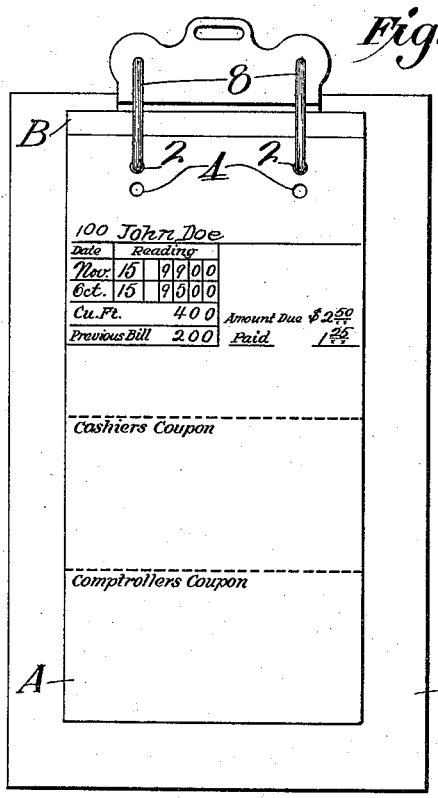
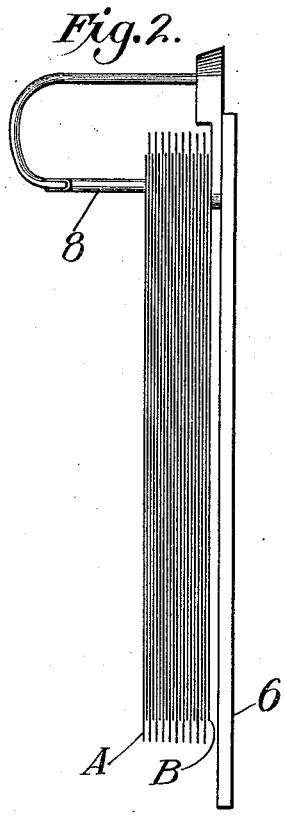
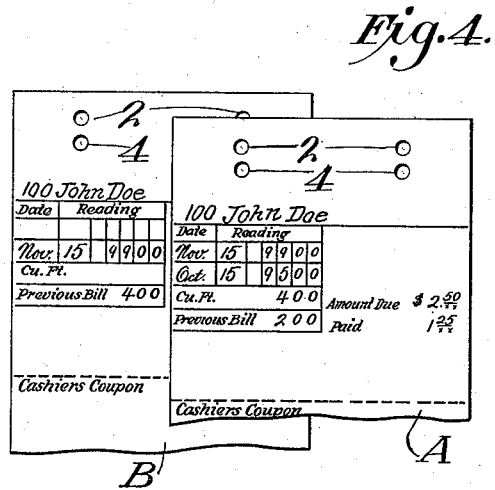
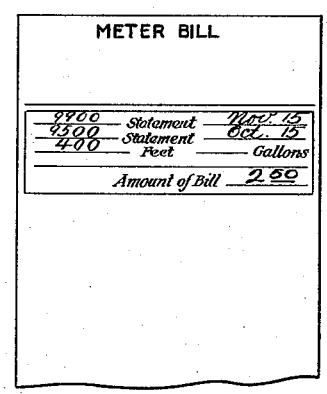
WITNESSES:
INVENTOR
T. O'Donnell
BY
ATTORNEY
COLUMBIA PLANOGRAPH CO., WASHINGTON, D. C.

UNITED STATES PATENT OFFICE.

TERENCE O'DONNELL, OF KANSAS CITY, MISSOURI.

BILL AND HOLDER FOR THE SAME.

1,149,778.

Specification of Letters Patent.

Patented Aug. 10, 1915.

Application filed December 29, 1913. Serial No. 809,241.

*To all whom it may concern:*

Be it known that I, TERENCE O'DONNELL, a citizen of the United States, residing at Kansas City, in the county of Jackson and State of Missouri, have invented certain new and useful Improvements in Bills and Holders for the same, of which the following is a specification.

This invention relates to a new form of bill with means for holding a number of the same in a certain predetermined relation for use, and has particular reference to bills which are to be prepared from meter readings taken periodically, where each bill contains data forming a factor in the computation of the next succeeding bill.

My object is to provide a bill adapted to be filled out by the meter reader himself and delivered immediately to the owner of the premises, in doing which he simultaneously enters the necessary data in the next succeeding bill for the same premises, this succeeding bill to form a temporary record for the use of the office.

To this end the invention comprises certain novel and peculiar features hereinafter described and particularly pointed out in the appended claims, and for a full understanding thereof reference will be had to the accompanying drawing, in which—

Figure 1 is a plan view of a file embodying the features of the present invention; Fig. 2 is a side view of the same; Fig. 3 is a plan view of a form of meter bill now in common use; Fig. 4 is a plan view of fragments of a pair of bills with one shifted laterally on the other to show more clearly the character of their longitudinally shifted relation when in use.

As illustrated in the drawing, my new form of meter bill provides space for both the new and old meter readings and also has attached thereto the usual cashier and comptroller coupons. However, in the new form, the arrangement of the blank spaces on the bill differs in locating the readings to one side, *i. e.*, to the left, and in providing an additional space for the amount of the "Previous bill," and also spaces at the other side, *i. e.*, to the right, for the cash amounts represented by both the present bill and the last previous bill, as shown on the drawing opposite the words "Amount due" and "Paid" (compare Figs. 1 and 3). At some place upon each bill I place a mark whereby the customer can be identified. The marking may be by number, name or route but for convenience I have shown the marking by number and name set forth as John Doe.

The bills are to be arranged by routes with a bill "A" for each meter of the route, containing the date of the last meter reading and the amount thereof filled in, and a blank bill "B" underlying each of the bills "A." The bills "A" and "B" are also arranged in longitudinally shifted relation so that the top blank space for the top reading to be entered by the meter reader in bill "A" will overlie the second blank space in bill "B" (see Fig. 4). From this arrangement it will be understood that if a carbon duplicating means be provided between the bills, the entry of the present meter reading in the first blank space in bill "A" will be duplicated in the second blank space in bill "B." The reader will then, at the time of reading the meter, subtract the last previous meter reading, which occurs in the second space of bill "A," from the new reading, and enter the difference in the third space of bill "A," and also the amount due for the same in the space provided at the right margin of the bill. These entries will also be duplicated in bill "B" in the spaces corresponding to "Previous bill" and "Paid" respectively. Bills "A" will be delivered to the consumers at the date of reading the meters, and bills "B" returned to headquarters for the temporary use of the accountants. When the date arrives for the next reading of the meters, the bills "B" take the place of the previous bills "A," and fresh blank bills are substituted in the relation formerly occupied by said bills "B," and the same procedure gone through with as above described.

While any appropriate means may be employed for holding the bills in the desired staggered relation, I have found it convenient to provide each bill with two sets of perforations 2, 2, and 4, 4, spaced a distance apart equal to the width of the spaces provided for the meter readings. The bills are then placed upon a file holder 6, with the filing posts 8 passed through the perforations 2, 2, of bills "A" and the perforations 4, 4, of bills "B". The holder and both sets of bills are taken by the meter reader with him on his route, and as fast as the readings are taken the bills "A" are removed and delivered to the consumers to be presented by them at the office on making payment.

From the foregoing it will be apparent that I have devised a form of bill the use of which minimizes the opportunities for error in its preparation and expedites the delivery of the same to the consumer. The reading of the meters has heretofore been a separate process, the readings being taken by routes and later transferred to the books at headquarters, and still later the bills are prepared from the records thus made and issued to the consumers. In this way error may creep in at any one of the several stages, and much needless loss of time is incurred, amounting usually to several weeks, in getting the bills into the hands of the consumers. In the use of bill forms as above described, there is no chance for error except by the meter reader himself at the time of taking the reading and making the corresponding entries on the bill, and there is no delay whatever in rendering the bill, which may thus be made due and payable the same day the meter is read. Furthermore, the expense of mailing out the bills or of having a messenger making special trips for delivering the same is avoided.

While the above represents what now appears to me to be the preferred mode of carrying out the object of my invention, I desire to be understood as reserving the right to such modifications and changes as may fairly fall within the scope of the appended claims.

I claim:

1. In a combined meter bill file and holder therefor a plurality of pairs of like forms each having blank spaces indicated thereon for two sets of dates and meter readings one above the other, a blank space indicated below the lower of said spaces for the amount of the difference between said meter readings, a blank space indicated opposite said last mentioned space for the price corresponding to said difference, and blank spaces respectively for accommodating the data corresponding thereto on a previous bill, said forms being grouped in pairs, the upper one of each pair being shifted down by the distance between such spaces whereby the upper blank spaces for the date and meter reading will overlie the corresponding lower blank spaces of the next adjacent forms, and means for holding said series of forms in said shifted relation.

2. In a combined meter bill file and holder therefor, a plurality of pairs of duplicate sheets each having blank spaces indicated thereon for two sets of dates and meter readings one above the other, a blank space indicated below the lower of said spaces for the amount of the difference between said meter readings, a blank space indicated opposite said last mentioned space for the price corresponding to said difference, and blank spaces indicated below said two last mentioned spaces respectively for accommodating the data corresponding thereto on a previous bill, each of said sheets being provided with two sets of perforations spaced apart a distance equal to the width of one of said blank spaces, and a file holder having file posts extending through one of the sets of perforations of alternate sheets of each pair and through the other sets of perforations of the remaining bills to cause the lower blank spaces for the date and meter readings of the latter bill forms to underlie the corresponding upper blank spaces of the other forms of the series.

3. In a combined meter bill file and holder therefor, a plurality of pairs of duplicate sheets each having blank spaces indicated thereon for two sets of dates and meter readings one above the other, and a blank space indicated below the lower of said spaces for the amount of the difference between said meter readings, alternate sheets of each pair being shifted longitudinally relatively to the remaining sheets to cause their upper blank spaces for the date and meter readings to overlie the lower of the corresponding blank spaces of the next adjacent sheet, and means for holding said sheets in said shifted relation.

In testimony whereof, I affix my signature, in the presence of two witnesses.

TERENCE O'DONNELL.

Witnesses:
  H. C. RODGERS,
  G. Y. THORPE.

Copies of this patent may be obtained for five cents each, by addressing the "Commissioner of Patents, Washington, D. C."